United States Patent
Bates et al.

(10) Patent No.: US 8,095,878 B2
(45) Date of Patent: Jan. 10, 2012

(54) METHOD FOR SPELL CHECK BASED UPON TARGET AND PRESENCE OF AVATARS WITHIN A VIRTUAL ENVIRONMENT

(75) Inventors: Cary Lee Bates, Rochester, MN (US); Zachary A. Garbow, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 870 days.

(21) Appl. No.: 12/144,176

(22) Filed: Jun. 23, 2008

(65) Prior Publication Data

US 2009/0319915 A1    Dec. 24, 2009

(51) Int. Cl.
G06F 3/048 (2006.01)
G06F 15/16 (2006.01)
G06F 17/00 (2006.01)
G09G 5/00 (2006.01)

(52) U.S. Cl. ........ 715/706; 715/753; 715/754; 715/755; 715/756; 715/757; 715/758; 715/256; 715/257; 715/258; 715/259; 715/260; 715/261; 709/204; 709/206

(58) Field of Classification Search .......... 715/706, 715/753, 754, 755, 756, 757, 758, 256, 257, 715/258, 259, 260, 261; 709/204, 205, 206
See application file for complete search history.

(56) References Cited

U.S. PATENT DOCUMENTS

| | | | |
|---|---|---|---|
| 5,880,731 A * | 3/1999 | Liles et al. | 715/758 |
| 7,765,265 B1 * | 7/2010 | Granito et al. | 709/206 |
| 2005/0137015 A1 * | 6/2005 | Rogers et al. | 463/42 |
| 2005/0257147 A1 * | 11/2005 | Brill et al. | 715/533 |
| 2007/0129112 A1 * | 6/2007 | Tarn | 455/566 |
| 2007/0150426 A1 * | 6/2007 | Asher et al. | 706/20 |
| 2010/0275118 A1 * | 10/2010 | Iakobashvili et al. | 715/257 |

OTHER PUBLICATIONS

Tapley, Rebecca, Designing your Second Life, Jul. 2007, New Riders, Chapter 5.*

* cited by examiner

*Primary Examiner* — Chat Do
*Assistant Examiner* — Jordany Nunez
(74) *Attorney, Agent, or Firm* — Cantor Colburn LLP

(57) ABSTRACT

The exemplary embodiment of the present invention relates to the dynamic activation and deactivation of a spell check feature option for instant message chat session features within a virtual environment. As such, the spell check feature can be activated and deactivated within the virtual environment based upon the identity of an engaged party to chat session or the identities of other parties that are in proximity to the chat session parties within the virtual environment.

2 Claims, 3 Drawing Sheets

METHOD FOR SPELL CHECK BASED UPON TARGET AND PRESENCE OF AVATARS WITHIN A VIRTUAL ENVIRONMENT

BACKGROUND OF THE INVENTION

1. Field of the Invention

This invention relates to instant message communications within a virtual world environment, and particularly to the implementation of target based spell checking operations of instant message communications within a virtual world environment.

2. Description of Background

Virtual worlds are computer based simulated environments wherein environment system users inhabit a virtual environment and interact with other system users by the use of graphical avatars that are representative of the user. Typically, computer simulated virtual environments are created to be similar to real-world environments. The virtual environments can also be created to abide by the rules of the real world in regard to physical laws, real-time communication between parties, etc. One of the ways virtual environment users can communicate in a virtual world is through instant message chat sessions. These chat sessions can be initiated upon a user's maneuvering of their displayed avatars in a manner so as to be in proximity to the avatar of an individual with whom they desire to communicate.

In the instance that a system user wishes to have a formal interaction with another individual the system user will typically activate the instant messaging spell check feature within their virtual world interface client application so that they do not make any spelling errors. Typically, in operation a the spell checking feature will underline misspelled words as they are entered within the instant messaging text window, thus identifying misspelled words to a the text author and presenting the author with an opportunity to correct the misspelled word. In other instances the system user may be engaged in informal conversation with an acquaintance and thus may not care about the spelling content of their typed message since they know that the context will be understood by the intended party. In this instance, the intent is to quickly transcribe their message without the burden of being slowed down by having their attention diverted when a word that is misspelled is underlined.

SUMMARY OF THE INVENTION

The shortcomings of the prior art are overcome and additional advantages are provided through the provision of a method for the activation or deactivation of an instant messaging spell check feature based upon the presence of a target avatar or a predetermined set of avatars within a virtual world environment. The method comprises assigning avatar users and their associated avatars with either a formal avatar user group or an informal avatar user group. An avatar user and their associated avatar can be manually assigned to a group or automatically assigned to a group by identifying a target avatar user and the user's associated avatar and setting a spell check feature of an instant messaging component within a virtual world application environment to an AUTOMATIC mode of operation. An avatar user and their associated avatar can also be automatically assigned to a group by performing a spell check operation upon the text comprised within an instant message chat session occurring between a system user and the target avatar user and monitoring the spell check operation in order to determine if the spell check corrections provided by the spell check feature are accepted or ignored by the system user.

In the instance that a spell check correction is accepted by the system user a formal user score that is associated with the target avatar user is incremented and an informal user score that is associated with the target avatar user is decremented. In the instance that the spell check correction is ignored by the system user the informal user score that is associated with the target avatar user is incremented and the formal user score that is associated with the avatar user is decremented. Also, it is determined if the accrued formal and informal user scores are respectfully greater than a predetermined formal user score threshold and an informal user score threshold value. Thus, in the instance that the formal user score is greater than the formal user score threshold value then the avatar user is designated as a formal user and the spell check feature will be set to an ON mode of operation, further, thereafter within any instant messaging chat session that is initiated between the system user and the avatar user the spell check feature will be set to the ON mode of operation. And in the instance that the informal user score is greater than the formal user score threshold value then the avatar user is designated as an informal user and the spell check feature will be set to an OFF mode of operation, further, thereafter within any instant messaging chat session that is initiated between the system user and the avatar the spell check feature will be set to the OFF mode of operation.

The method also comprises initiating an instant messaging chat session, wherein the spell check feature is enabled in the instance that an instant message chat session is initiated with a target avatar that is associated with the formal avatar user group. The spell check feature is disabled in the instance an instant message chat session is initiated with a target avatar that is associated with the informal avatar user group. Also, the spell check feature is enabled in the instance that a secondary avatar that is associated with the formal avatar user group is in a proximity within the virtual world environment of the system user and target avatar user that allows a secondary avatar user to witness the instant message chat session between the system user and the target avatar user.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
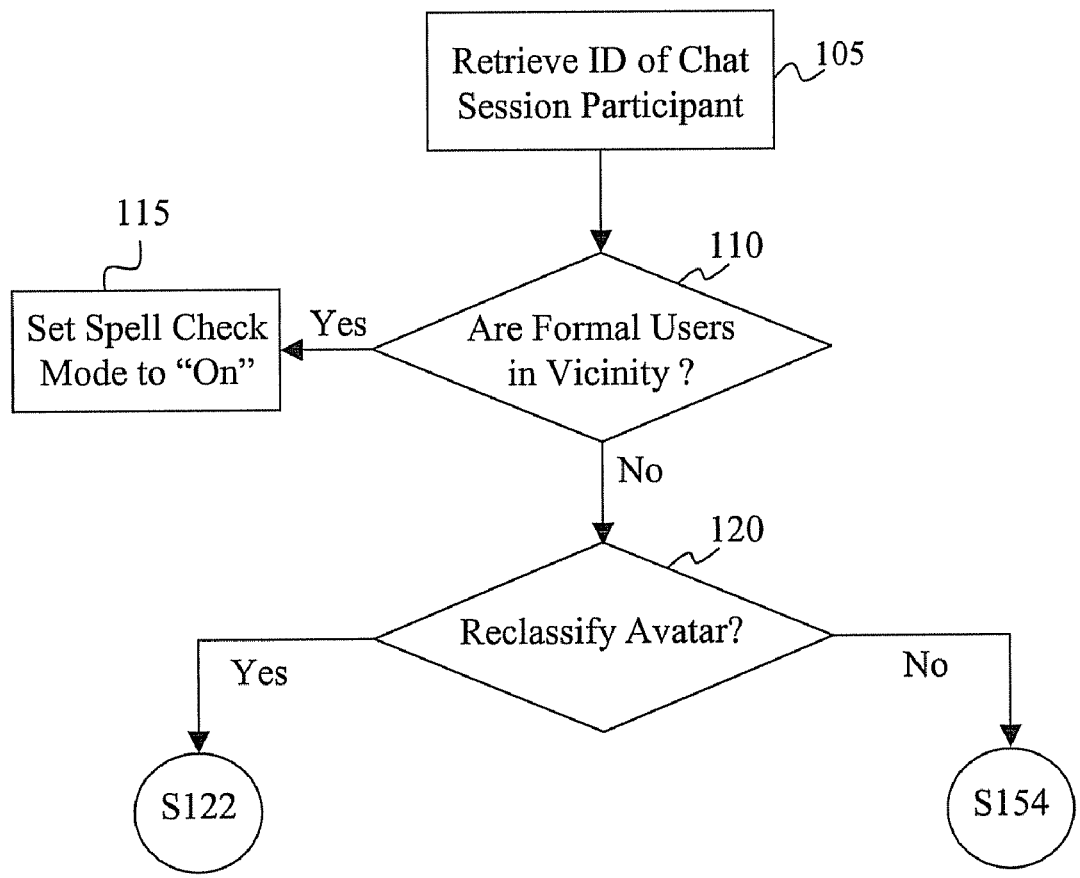
FIG. 1 illustrates flow diagram detailing a method for activating a spell check feature in accordance with an exemplary embodiment of the present invention.

The detailed description explains the preferred embodiments of the invention, together with advantages and features, by way of example with reference to the drawings.

DETAILED DESCRIPTION OF THE INVENTION

An exemplary embodiment of the invention is described below in detail. The disclosed embodiment is intended to be illustrative only since numerous modifications and variations therein will be apparent to those of ordinary skill in the art.

Aspects of the exemplary embodiment of the present invention can be implemented within a conventional computing system environment comprising hardware and software elements (not shown) wherein a virtual world environment client application executing at a client computing system is in communication with a virtual world environment application that is executing remotely at a server system. Within the exemplary embodiment, a spell checking software application can be executed locally in conjunction with an instant messaging software component comprised within the virtual world environment client application.

More specifically, the methodologies of the present invention can be implemented to program a conventional computer system in order to accomplish the prescribed tasks of the present invention as described below. The software elements of the programmed computer are envisioned for purposes of clarity as executable in a main memory of a computing system, but as persons skilled in the art will understand, they may not in actuality reside simultaneously or in their entireties in such a memory.

The exemplary embodiment of the present invention provides for the dynamic activation and deactivation of a spell check feature option implemented in conjunction with the operations of an instant messaging feature comprised within a virtual world environment. These activities are implemented based on with whom a system user is conversing and who else within the virtual world can see the system user's conversational messages.

Within the exemplary embodiment of the present invention information that is from a virtual environment regarding who can see an instant message is used in conjunction with user-specified spell checking activation or deactivation information to determine if a user desires to have a spell check application enabled during an instant message chat session within a virtual world environment. In an aspect of the exemplary embodiment, a list of individuals that the system user wishes to have an informal communication with is built. If the system user is conversing with a user (visually represented by avatars displayed within a virtual environment that are associated with the parties who are interacting in conjunction with an instant messaging chat session window) and the system user wishes to communicate informally, and no formal users are able to see the conversation, then the spell checking feature is disabled. Conversely, if a user who is deemed to be formal is present, then the spell check feature is enabled.

Within the exemplary embodiment of the present invention a system user can manually create a list of formal and informal avatar users and their associated avatars wherein a review of the list within the virtual world environment client application can be utilized to activate or deactivate a spell check feature of an instant messaging application within a virtual world environment. A system user who desires to have a formal interaction with another individual will typically activate the instant messaging spell check feature within their virtual world interface client application so that they do not make any spelling errors while conversing with the individual within the virtual environment. In operation a spell check feature underlines misspelled words as they are entered within the instant message text entry window, thus identifying the words and presenting the user with an opportunity to correct the misspelled word. Thus, in this instance the system user will register the individuals that they wish to have formal instant messaging communications with as formal users within the listing of avatar users and their associated avatars.

In another instance, the system user may be engaged in an informal conversation with an acquaintance and thus may not care about the spelling content of their typed messages since they know that the context will be understood by the intended party. In this instance, the intent is to quickly transcribe their message without the burden of being slowed down by having their attention diverted when a word that is misspelled is underlined. In this instance the system user will register the individuals that they wish to have informal instant messaging communications with as informal users within the listing of avatar users and their associated avatars.

Also within the exemplary embodiment a spell checking activation/deactivation learning mode feature is provided wherein avatar users and their associated avatars can automatically be classified as formal or informal users by the results of the monitored usage of the spell checker by a system user within the virtual environment. Within the exemplary embodiment, the spell checker feature is configured to be activated via an ON or AUTOMATIC operational mode, or deactivated via an OFF operational mode. When in the AUTOMATIC operational mode, the spell checker would initially be activated until a usage analysis component within the spell checker has determined that the system user appears to desire to be either formal or informal when chatting with a given avatar user. Further, each avatar user and the avatar that is associated with the user have an associated formal user score and an informal user score, wherein the formal and informal user score of the avatar user are utilized to respectively activate or deactivate the spell check feature.

For example, in the instance that a system user rarely selects the suggested changes that are presented by the spell checker feature when conversing with a user A, the informal user score that is associated with user A is increased (either incrementally or through another conventional statistical record keeping method) in each instance that the system user ignores the suggested corrections. Thus, user A's informal score grows each time the user ignores the spell checkers advice. If the spell checker determines the uncorrected and misspelled words to be common misspellings/typing errors, then the informal score is configured to grow faster. Eventually the informal score would grow to a point that it will be greater than a predetermined threshold value. And as a result, user A will be identified as an informal user and the spell checking feature will no longer be automatically activated when the system user sends instant messages to user A. However, if the system user wanted her instant messages to user A to be spell checked all she would have to do is reactivate the spell check feature. This action would put the spell checker into the learning mode and as the user corrects misspellings the formal user score that is associated with user A would increase and the informal score decrease.

If on the other hand the system user always accepts the spell checkers suggestions within a chat session that the system user has initiated with a user B, the formal user score that is associated with user B will be increased. Once user B's formal score exceeds a predetermined threshold value user B will be determined to be a formal user and the spell check feature will be activated whenever the system user is engaged in a chat session with user B. In accordance with the exemplary embodiment, in the event that the system user is engaged in a chat session with user A (designated an informal user) wherein the spell checker is deactivated, if user B (designated a formal user) is in close enough proximity within the virtual environment where she can witness the chat session between the system user and user A, then as a result of user's B registration list classification, the spell check feature will be activated.

Within the exemplary embodiment avatars within a virtual environment can directly be associated with a formal or informal user score wherein the formal and informal scores are adjusted based upon the system user's behavior in the presence of the avatar. Further, the formal and informal scores are adjusted more slowly than if the system user was directly addressing them. For example, over time, if the system user is always careful of her spelling when the avatar is present, the avatar's formal score would grow to the point were the avatar will be considered a formal user.

Figure 2:
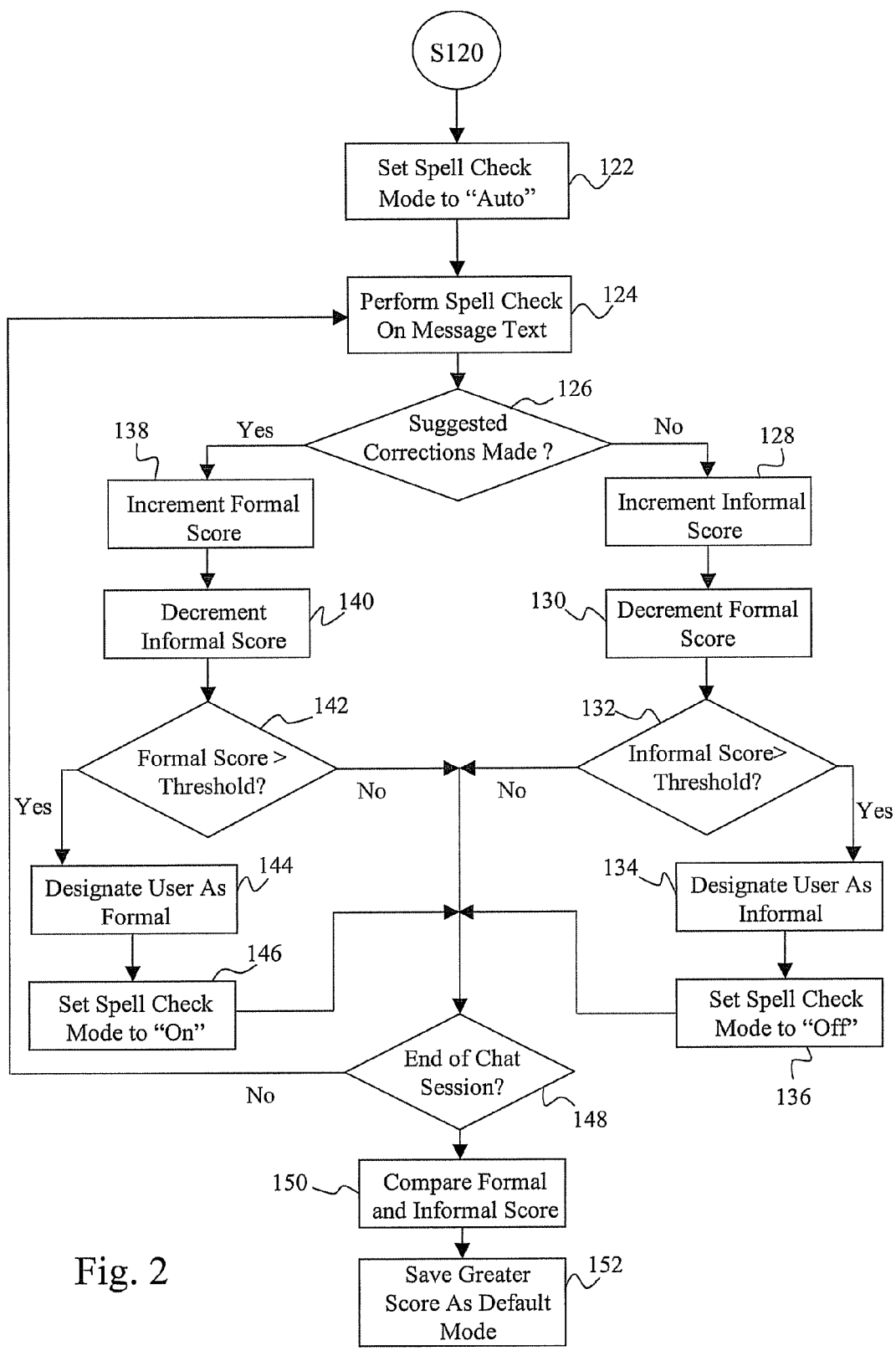
FIG. 2 illustrates a flow diagram detailing a method for registering an avatar user with a formal or informal spell check user group in accordance with an exemplary embodiment of the present invention.
Figure 3:
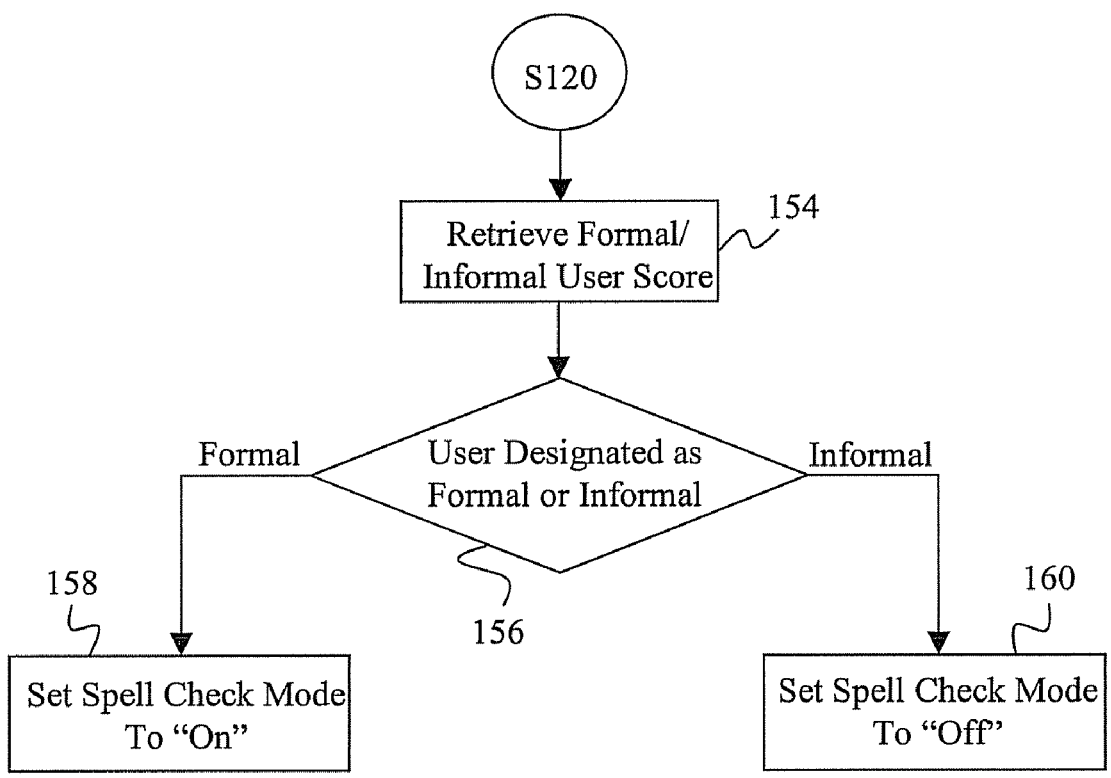
FIG. 3 illustrates a flow diagram detailing a method for activating or deactivating a spell check feature in accordance with an exemplary embodiment of the present invention.

FIGS. 1, 2, and 3 show flow diagrams that illustrate components of a method for the activation or deactivation of an instant messaging spell check feature based upon the presence of a target avatar or a predetermined set of avatars within a virtual world environment. An instant messaging chat session is initiated within a virtual environment between a system user and a target avatar user. As a result of the initiation of the chat session an attempt is made at the virtual world environment client application to identify the target avatar user among the registrants of the system user's formal and informal user listing (step 105). A determination is made to if any formal users are in visual proximity of the avatars engaged within the chat session (step 110) within the virtual environment. The spell check feature is activated in the instance that another avatar that is associated with the formal avatar user group listing is in a close enough proximity within the virtual world environment with the system user and target avatar user so that the additional avatar user can witness the instant message chat session between the system user and the target avatar user (step 115).

If there are no additional formal user group member avatars in proximate location to the system user and target avatar user within the virtual environment then a determination is made to if the avatar user has been associated with a user grouping or if the system user desires to have the avatar user's designation reclassified according to the group training mode (step 120). In the instance that an avatar user has been associated with a user grouping, then at step 154, the formal and informal user scores for the avatar user are retrieved. A review of the avatar user's formal and informal group designation is performed (step 156). In the instance the avatar user is designated as being a member of the formal user group, the spell check feature will be enabled for the instant message chat session that has been initiated with the avatar user (step 158). Conversely, the instance the avatar user's informal score designates the user as being a member of the informal user group, the spell check feature will be disabled for the instant message chat session that has been initiated with the avatar user (step 160).

In the instance that the avatar user has not been associated with a user group or that the system user simply desires to have the avatar user's designation retrained within the system then the spell check feature is set to the AUTOMATIC mode of operation (step 122). Thereafter, the spell check operation is performed upon the text comprised within the instant message chat session between the system user and the target avatar user (step 124). At step 126, the spell check operation of the chat session is monitored in order to determine if the spell check corrections provided by the spell check feature are accepted or ignored by the system user (step 126).

In the instance that a spell check correction is accepted by the system user, then the formal user score that is associated with the target avatar user is incremented and an informal user score that is associated with the target avatar user is decremented (steps 138 and 140). Conversely, in the instance that the spell check correction is ignored by the system user the informal user score that is associated with the target avatar user is incremented and the formal user score that is associated with the avatar user is decremented (steps 128 and 130).

At steps 132 and 142, determinations are made to if the accrued formal and informal user scores are respectfully greater than a predetermined formal user score threshold and an informal user score threshold value. In the instance that the formal user score is greater than the formal user score threshold value then the avatar user is designated as a formal user and the spell check feature will be set to the ON mode of operation (step 144). Thereafter, within any instant messaging chat session that is initiated between the system user and the avatar user the spell check feature will be set to the ON mode of operation (step 146). And also in the instance that the informal user score is greater than the formal user score threshold value then the avatar user is designated as an informal user and the spell check feature will be set to an OFF mode of operation (step 134). Thus, thereafter within any instant messaging chat session that is initiated between the system user and the avatar the spell check feature will be set to the OFF mode of operation (step 136).

If it is determined at steps 132 and 142 that neither score value is greater than its respective threshold value a determination is made to if the chat session is ongoing or has been completed (step 148). In the instance the neither the formal user score or the informal user score are greater than their respective thresholds (step 150), then the user score of greater value will be used to set the spell check mode of operation (step 152).

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for the activation or deactivation of an instant messaging spell check feature based upon the presence of a target avatar or a predetermined set of avatars within a virtual world environment, the method comprising:
assigning avatar users and their associated avatars with either a formal avatar user group or an informal avatar user group, wherein an avatar user and their associated avatar can be manually assigned to a group or automatically assigned to a group by:
identifying a target avatar user and the user's associated avatar;
setting a spell check feature of an instant messaging component within a virtual world application environment to an AUTOMATIC mode of operation;
performing a spell check operation upon the text comprised within an instant message chat session occurring between a system user and the target avatar user;
monitoring the spell check operation in order to determine if the spell check corrections provided by the spell check feature are accepted or ignored by the system user, wherein:
in the instance that a spell check correction is accepted by the system user a formal user score that is associated with the target avatar user is incremented and an informal user score that is associated with the target avatar user is decremented;
in the instance that the spell check correction is ignored by the system user the informal user score that is associated with the target avatar user is incremented and the formal user score that is associated with the avatar user is decremented; and
determining if the accrued formal and informal user scores are respectfully greater than a predetermined formal user score threshold and an informal user score threshold value, wherein:
in the instance that the formal user score is greater than the formal user score threshold value then the avatar user is designated as a formal user and the spell check feature will be set to an ON mode of operation, further, thereafter within any instant messaging chat session that is initiated between the system user and the avatar user the spell check feature will be set to the ON mode of operation, and
in the instance that the informal user score is greater than the formal user score threshold value then the avatar user is designated as an informal user and the spell check feature will be set to an OFF mode of operation, further, thereafter within any instant messaging chat session that is initiated between the system user and the avatar the spell check feature will be set to the OFF mode of operation; and
initiating an instant messaging chat session, comprising:
enabling the spell check feature in the instance that an instant message chat session is initiated with a target avatar that is associated with the formal avatar user group;
disabling the spell check feature in the instance the an instant message chat session is initiated with a target avatar that is associated with the informal avatar user group; and
enabling the spell check feature in the instance that a secondary avatar that is associated with the formal avatar user group is in proximity within the virtual world environment of the system user and target avatar user that allows a secondary avatar user to witness the instant message chat session between the system user and the target avatar user.

2. The method of claim 1, wherein if neither the formal user score or the informal user score are greater than their respective thresholds, then the user score of greater value will be used to set the spell check mode of operation.

* * * * *